United States Patent [19]

Cavezzan

[11] Patent Number: 4,741,966
[45] Date of Patent: May 3, 1988

[54] ORGANOPOLYSILOXANE COMPOSITION CURABLE BY HYDROSILYLATION CONTAINING PLATINUM/TRIENE COMPLEXES

[75] Inventor: Jacques Cavezzan, Villeurbanne, France

[73] Assignee: Rhone-Poulenc Specialties Chimiques, Courbevoie, France

[21] Appl. No.: 932,670

[22] Filed: Nov. 20, 1986

Related U.S. Application Data

[62] Division of Ser. No. 811,393, Dec. 20, 1985, Pat. No. 4,687,870.

[30] Foreign Application Priority Data

Dec. 20, 1984 [FR] France .................................. 84 19508

[51] Int. Cl.$^4$ ............................................. B32B 9/04
[52] U.S. Cl. .................................... 428/447; 427/387; 528/15; 528/31; 528/32; 525/478
[58] Field of Search ............................ 528/15, 31, 32; 525/478; 427/387; 428/447

[56] References Cited

U.S. PATENT DOCUMENTS 4,051,454 9/1977 Leiser et al. ........................... 528/15
4,699,813 10/1987 Cavezzan .............................. 528/31

Primary Examiner—Melvyn I. Marquis
Attorney, Agent, or Firm—Burns, Doane, Swecker & Mathis

[57] ABSTRACT

Novel platinum/olefin complexes, useful for the hydrosilylation curing catalysis of hardenable organopolysiloxane compositions, are facilely prepared by reacting a platinum halide with at least one alkali or alkaline earth metal carbonate or bicarbonate in the presence of an aliphatic triene ligand having the general formula:

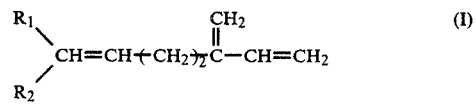

wherein $R_1$ is a linear or branched chain alkyl radical having from 1 to 6 carbon atoms, and $R_2$ is $R_1$ or a linear or branched chain alkenyl radical having from 2 to 16 carbon atoms and at least one site of ethylenic unsaturation, and said complex having a ratio, in gram-atoms of halogen to gram-atoms of platinum, ranging from virtually 0 to 4.

6 Claims, No Drawings

ORGANOPOLYSILOXANE COMPOSITION CURABLE BY HYDROSILYLATION CONTAINING PLATINUM/TRIENE COMPLEXES

This application is a division of application Ser. No. 811,393, filed Dec. 20, 1985, now U.S. Pat. No. 4,687,870.

CROSS-REFERENCE TO RELATED APPLICATION

My copending application, Serial No. 811,350, now U.S. Pat. No. 4,699,813, filed concurrently herewith and assigned to the assignee hereof.

BACKGROUND OF THE INVENTION

1. Field of the Invention

The present invention relates to novel platinum/olefin complexes, and, more especially, to platinum/triene complexes useful as hydrosilylation catalysts, to the preparation thereof and to organopolysiloxane compositions comprising such catalytic complexes.

2. Description of the Prior Art

Many compounds and complexes of platinum have to date been proposed to this art to promote the addition reaction of an organohydropolysiloxane having "SiH groups to a diorganopolysiloxane containing hydrocarbon radicals which are alkylenically unsaturated, for the purpose of forming an addition product comprising an added silicon-carbon bond.

This addition reaction can be represented schematically in the following manner:

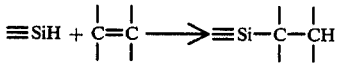

One of the first such catalysts was chloroplatinic acid, as described in U.S. Pat. No. 2,823,218, or platinum metal arranged on a finely divided support, as described in U.S. Pat. No. 2,970,150.

In U.S. Pat. Nos. 3,159,601 and 3,159,602, platinum/olefin complexes were proposed for the purpose of reducing the disadvantages inherent in the use of finely divided platinum or chloroplatinic acid, the disadvantages being related to poisoning of the catalyst and to its excessively low reactivity. With the same object, in U.S. Pat. No. 3,220,972, the reaction products of platinum derivatives with alcohols, aldehydes and ethers were proposed as a catalyst.

More recently, in U.S. Pat. No. 3,715,334, 3,775,432 and 3,814,730, there were proposed complexes of platinum and vinylsiloxane, treated with a base, in which complexes the ratio of halogen to platinum is between 0, or a decimal number close to 0, and approximately 1.

In European Pat. No. 57,459, platinum/styrene complexes treated with a base are described, in which the ratio of halogen to platinum (calculated in gram-atoms of platinum and halogen) is greater than 1 but less than 4.

The platinum complexes described above have admittedly enabled advances in the state of the art, but they have at least one of the following disadvantages:

(1) they are unstable and display low catalytic activity after a relatively short storage time, on the order of one month or less;

(2) they display insufficient reactivity at a low concentration;

(3) they are particularly difficult to prepare in a simple and reproducible manner, especially as regards those described in said '459 European patent.

SUMMARY OF THE INVENTION

Accordingly, a major object of the present invention is the provision of novel platinum complexes which are conspicuously devoid of the aforesaid disadvantages and drawbacks, or which, at very least, display same to such a limited extent that the commercial attractiveness thereof is not impaired.

Briefly, the present invention features preparing a platinum/olefin complex hydrosilylation catalyst, by reacting a platinum halide with at least one basic compound comprising the alkali metal carbonates or bicarbonates, or the alkaline earth metal carbonates or bicarbonates, in the presence of an olefin ligand which is an aliphatic triene hydrocarbon having the general formula:

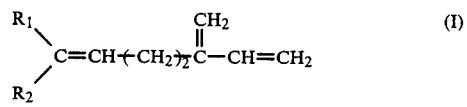

in which $R_1$ is a linear or branched chain alkyl radical having from 1 to 6 carbon atoms, $R_1$ preferably being a methyl radical, and $R_2$ is also an alkyl radical having from 1 to 6 carbon atoms, or a linear or branched chain alkenyl radical having from 2 to 16 carbon atoms and at least one site of ethylenic unsaturation, to obtain a platinum/triene complex possessing a Cl/Pt ratio, in gram-atoms of halogen to gram-atoms of platinum, ranging from virtually 0 to 4, inclusive.

DETAILED DESCRIPTION OF THE INVENTION

More particularly according to the present invention, representative trienes having the aforesaid formula (I) include:

(i) β-myrcene having the formula:

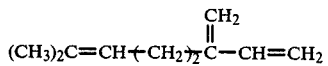

Processes for the preparation thereof are noted at reference 6180, *The Merck Index* (10th Edition).

(ii) β-farnesene having the formula:

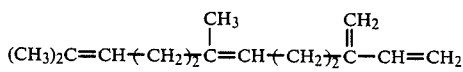

Processes for the preparation thereof are noted at reference 3874, *The Merck Index* (10th Edition).

(iii) β-springene having the formula:

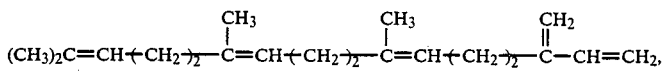

described by B. V. Burger et al., *Tetrahedron Lett.*, 6221 (1978).

For carrying out the process of the invention, it is desirable to use a large molar excess of ligand relative to the platinum halide; a ligand/platinum halide molar ratio ranging from 10 to 30 is preferably used.

The amount of halogen chemically combined in the platinum/triene complexes of the invention can be determined by any known suitable method, in particular by the disodiumbiphenyl technique described in *Analytical Chemistry*, 22, 311 (February 1950).

The same applies to evaluating the platinum content of the complexes according to the invention. A suitable method is that employing atomic spectroscopy, as described by R. Dockyer and G. E. Haives, *The Analyst*, 84, page 385, (1959).

To carry out the process according to the invention, chloroplatinic acid of the formula:

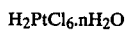

can be used, the same being readily commercially available in its hexahydrate form (n=6).

Metal salts of chloroplatinic acid, such as, for example, $NaHPtCl_6.nH_2O$, $KHPtCl_6.nH_2O$, $Na_2PtCl_6.nH_2O$ and $K_2PtCl_6.nH_2O$, can also be used.

$PtCl_4.nH_2O$ and the halides of platinous type, such as $PtCl_2$, $Na_2PtCl_4.nH_2O$, $H_2PtCl_4.nH_2O$, $NaHPtCl_4.nH_2O$, $KHPtCl_4.nH_2O$ and $K_2PtBr_4$, can also be used.

Chloroplatinic acid in its hydrated or anhydrous form constitutes the preferred starting material according to the invention.

The process of the invention is, furthermore, preferably carried out in an organic solvent in order to dissolve the platinum halide and the complex formed. This solvent is preferably selected from among a linear or branched chain aliphatic alcohol having from 1 to 6 carbon atoms, preferably isopropanol, an aromatic organic solvent or a saturated hydrocarbon such as benzene, toluene, xylene and hexane.

As the basic compound, alkali metal carbonates and bicarbonates and alkaline earth metal carbonates and bicarbonates are used, such as sodium carbonate, sodium bicarbonate, potassium carbonate and potassium bicarbonate, preferably in an excess such that the Cl/Pt ratio falls well within the aforenoted range.

The preferred basic compounds are alkali metal bicarbonates, which enable the chemical reduction of the catalyst to its metallic form to be avoided with certainty.

The reaction temperature generally ranges from 20° to 120° C., preferably from 60° to 100° C., for a period typically ranging from 5 min to 2 hours.

The final Cl/Pt ratio in the product complex depends upon the choice of the starting halide, the amount of basic compound added and the reaction temperature.

The reaction time essentially depends on the temperature, this time being shorter the higher the temperature.

The complexes for which the Cl/Pt ratio ranges from virtually 0 to 2, inclusive, are preferred, since they are more soluble in the solvent used in their preparation, and they show greater reactivity in the organopolysiloxane compositions.

By a Cl/Pt ratio "virtually equal to 0", there is intended a ratio which can be equal to 0.1 or less without being zero. It has in fact been observed that it is almost impossible to have a ratio precisely equal to 0, since traces of inorganic chlorine which originate from the reaction by-products, and which are extremely difficult to remove completely, always persist in the reaction medium.

The platinum complex according to the invention can be used to catalyze organopolysiloxane compositions which entail hydrosilylation reactions in their hardening or curing. Before use, this complex is preferably diluted in an organic solvent compatible with silicones (toluene, hexanol, chlorobenzene or isopropanol, for example) or in a vinylated silicone oil.

Such compositions can be compositions which harden to elastomers at room temperature (RTV), of the type described in U.S. Pat. Nos. 3,220,972 and 3,814,730, which can be used, inter alia, for impregnation, coating, encapsulation, molding and dental impressions.

These compositions can be coating compositions, either with or without solvent, which can be used to make a material non-sticking, as described, for example, in U.S. Pat. Nos. 4,057,596, 4,071,644 and 4,162,356 and British Pat. No. 1,374,732 for the solvent-free compositions, and in U.S. Pat. Nos. 3,527,659, 4,028,298 and British Pat. No. 1,240,520 for the compositions with solvents.

These compositions are generally stored before use as two components or two packs, one of the components containing the catalyst and generally at least a portion of the organopolysiloxane possessing organic radicals which are alkylenically unsaturated. The other component contains, in particular, the organohydropolysiloxane, and the two components are mixed, as required, immediately before use.

The alkylenically unsaturated organopolysiloxane and the organohydropolysiloxane can be cyclic or substantially linear; advantageously, they can be a polymer or copolymer.

The present invention, hence, also relates to an organopolysiloxane composition containing:

(1) at least one organopolysiloxane which possesses, per molecule, at least two alkylenically unsaturated groups bonded to a silicon atom;

(2) at least one organohydropolysiloxane which possesses, per molecule, at least three ≡SiH groups; and (3) a catalytically effective amount of a platinum/triene complex according to the present invention.

The compound (1) is advantageously an organopolysiloxane comprising silyloxy units of the formula:

in which Y is an alkylenically unsaturated hydrocarbon group having from 2 to 4 carbon atoms, inclusive. Y can be, for example, a vinyl, propenyl, allyl or butenyl group, with the vinyl group being the preferred.

Z is a monovalent hydrocarbon group which does not adversely affect the activity of the catalyst. Z is generally selected from among alkyl groups having from 1 to 8 carbon atoms, inclusive, such as methyl, ethyl, propyl and 3,3,3-trifluoropropropyl groups, and aryl groups such as xylyl, tolyl and phenyl, a ranges from 1 to 3, b ranges from 0 to 2 and a+b ranges from 1 to 3, all other units optionally being units of the formula:

$$Z_c SiO_{\frac{4-c}{2}} \quad (2)$$

in which Z is defined as above and c has a value ranging from 0 to 3.

The compound (2) is advantageously an organohydropolysiloxane containing silyloxy units of the formula:

$$H_d W_e SiO_{\frac{4-d-e}{2}} \quad (3)$$

in which W is a monovalent hydrocarbon group which does not adversely affect the activity of the catalyst and which conforms to the same definition as Z; d has a value ranging from 1 to 3, e has a value ranging from 0 to 2, and d+e has a value ranging from 1 to 3, all other units optionally being units of the formula:

$$W_g SiO_{\frac{4-g}{2}} \quad (4)$$

in which W is as defined above, and g has a value ranging from 0 to 3. All the limiting values of a, b, c, d, e and g are inclusive.

The compound (1) can be formed exclusively of units of formula (1) or can contain, in addition, units of formula (2).

Compound (1) can have a linear, branched, cyclic or network structure. The degree of polymerization thereof is 2 or more, and is generally less than 5000.

Y is generally a vinyl radical and Z is generally selected from methyl, ethyl and phenyl radicals.

The compounds (1) are well known to this art and are described, for example, in U.S. Pat. Nos. 3,220,972, 3,344,111 and 3,434,366.

In the formulae (1) and (2) above, a can be an integer ranging from 1 to 3, preferably 1; b is an integer ranging from 0 to 2, the sum of a+b has a value ranging from 1 to 3 and c is an integer having a value ranging from 0 to 3.

Examples of silyloxy units of the formula (1) are the vinyldimethylsiloxane unit, the vinylphenylmethylsiloxane unit and the vinylsiloxane unit.

Examples of silyloxy units of the formula (2) are $SiO_{4/2}$, dimethylsiloxane, methylphenylsiloxane, diphenylsiloxane, methylsiloxane and phenylsiloxane units.

Examples of compounds (1) are polydimethylsiloxanes having dimethylvinylsilyloxy end groups, polymethylvinylpolydimethylsiloxane copolymers having trimethylsilyloxy end groups, polymethylvinylpolydimethylsiloxane copolymers having dimethylvinylsilyloxy end groups and cyclic polymethylvinylsiloxanes.

The compound (2) according to the invention can be exclusively composed of units of the formula (3) or contains, in addition, units of the formula (4).

The compound (2) can have a linear, branched, cyclic or crosslinked structure. The degree of polymerization thereof is 2 or more, but generally less than 5000.

Group W has the same meaning as the group Z above.

In the formulae (3) and (4) above, d is an integer ranging from 1 to 3, preferably 1; e is an integer ranging from 0 to 2, the sum of d+e ranges from 1 to 3 and g is an integer ranging from 0 to 3.

Examples of units of the formula (3) are:

$H(CH_3)_2 SiO_{\frac{1}{2}}$, $HCH_3 SiO_{2/2}$, $H(C_6H_5)SiO_{2/2}$.

The examples of units of the formula (4) are the same as those given above for the units of the formula (2).

Examples of compound (2) are:
polydimethylsiloxanes having hydrodimethylsilyloxy end groups, polydimethylpolyhydromethylsiloxane copolymers having trimethylsilyloxy end groups, polydimethylpolyhydromethylsiloxane copolymers having hydrodimethylsilyloxy end groups, polyhydromethylsiloxanes having trimethylsilyloxy end groups and cyclic polyhydromethylsiloxanes.

The ratio of the number of hydrogen atoms linked to the silicon in the compound (2) to the number of alkylenically unsaturated groups in the compound (1) ranges from 0.4 to 5, and preferably from 0.6 to 2. This ratio can, however, range from 2 to 5 if it is desired to make elastomer foams.

The compound (1) and/or the compound (2) can be diluted in an organic solvent which is compatible with the silicones.

The compositions can contain, in addition to the usual additives, depending upon their fields of intended use, such as reinforcing and/or non-reinforcing fillers for elastomeric compositions (pyrogenic silica, precipitated silica, ground quartz, calcium carbonate, and the like), inhibitors for elastomeric compositions and thin layer coating compositions, such as the acetylene derivatives described in U.S. Pat. Nos. 3,445,120 and 4,347,346, polydimethylsiloxane oils blocked at their polymer ends with trimethylsilyloxy groups, and the like.

The compositions of the invention can be used as such (neat) or diluted in an organic solvent.

The crosslinking of these compositions is performed at a temperature ranging from room temperature to 200° C., depending upon the type of composition and the amount of catalyst.

The curing temperature generally ranges from 60° to 140° C. The amount of catalyst by weight, calculated as weight of platinum metal, generally ranges from 2 to 600 ppm, typically from 5 to 200 ppm, based on the total weight of the composition.

The complexes according to the invention are compounds which are fairly easy to prepare, are stable on storage over very long periods at room temperature and retain their reactivity for a very long period. They are very reactive in small amounts and are especially useful in cold vulcanizable (RTV) elastomer compositions and in coating compositions, either with or without solvents, for imparting non-stick properties.

For this latter application, the compositions of the invention can hence be used either as such or diluted in a solvent. When they are dispersed or diluted in a solvent, a volatile organic solvent which is compatible with the composition is used, selected, for example, from alkanes, petroleum cuts containing paraffin compounds, toluene, heptane, xylene, isopropanol, methyl isobutyl ketone, tetrahydrofuran, chlorobenzene, chloroform and 1,1,1-trichloroethane. The solvent preferably constitutes from 50 to 99% by weight of the dispersion.

By evaporation of the solvent from the dispersion, the composition hardens, and these dispersions are thus useful as coating compositions for metal, wooden or glass articles and for flexible sheets of paper, plastic, and the like.

The solvent-free compositions can also be used to make a material, such as metal foils, glass, plastics or paper, non-adherent to other materials to which it would normally stick. In the case of a solvent-free composition, the composition advantageously has a viscosity not exceeding 5000 mPa.s, and preferably ranges from 10 to 4000 mPa.s at 25° C., and the ratio of the hydrogen atoms bonded to the silicon in (2) to the sum of the alkenyl radicals bonded to the silicon in (1) is at least 0.5:1, and generally less than 2:1, this ratio also being applicable to the resins with solvent. Furthermore, the compounds (1) and (2) are polymers and/or copolymers having substantially linear chains.

The solvent-free, that is to say, undiluted, compositions are applied by means of devices which are suitable for depositing small amounts of liquids in a uniform manner. For this purpose, there may be used the so-called "transfer coating" device which incorporates, in particular, two superposed rollers; the function of the lower roller, which dips into the coating bath in which the compositions are present, is to impregnate the upper roller with a very thin layer, and the function of the latter roller is then to deposit onto the paper the desired amounts of the compositions with which it is impregnated, such control of quantities being achieved by adjustment of the respective speeds of the two rollers which rotate in opposite directions. The diluted compositions, that is to say, those with a solvent, can be applied by means of devices used on industrial machines for coating paper, such as the engraved "thousand dot" roller and machines for the so-called "reverse roll" system.

Once deposited onto the supports, the compositions are hardened in a few seconds by passing same through tunnel ovens heated to 60°–200° C., the passage time through these furnaces varying generally from 2 to 30 seconds. This time depends, for a given oven length, on the speed at which the coated supports travel (this speed can exceed 200 meters per minute); in general, a support consisting of cellulosic material travels faster (for example, at a speed of 3 m/second for a temperature greater than 140° C.) than a plastic-based support. In effect, this latter material cannot withstand the effect of high temperatures, and it will therefore be subjected to a lower temperature but for a longer period, for example, it will travel at a speed of 0.75 m/second for a temperature on the order of 80° C.

The amounts of compositions deposited onto the supports can vary, and most frequently range from 0.1 to 5 g/m² of treated surface. These amounts depend upon the nature of the supports and the non-stick properties sought. Such amounts most frequently range from 0.5 to 1.5 g/m² for non-porous supports.

In order to further illustrate the present invention and the advantages thereof, the following specific examples are given, it being understood that same are intended only as illustrative and in nowise limitative. In said examples to follow, all percentages and parts are given by weight, unless otherwise indicated.

EXAMPLE 1

Preparation of a platinum/β-myrcene complex

A platinum/triene complex was prepared by mixing:
(i) 1 part of $H_2PtCl_6.6H_2O$;
(ii) 5 parts of isopropanol;
(iii) 2 parts of sodium bicarbonate $NaHCO_3$; and
(iv) 6 parts of β-myrcene.

The chloroplatinic acid was first dissolved in the isopropanol, $NaHCO_3$ was then added in small portions to avoid the formation of foam, since carbon dioxide was evolved, and the β-myrcene was then added.

The mixture was treated under reflux for 20 min at approximately 80° C. under stirring. The original orange coloration changed to yellow. The reaction mixture was cooled to room temperature and the isopropanol removed at 20° C. under a vacuum of 15 mbar. The inorganic impurities were precipitated in hexane and, after filtration, the solution was concentrated at 40° C. under a vacuum of 1.0 to 10 mbar. An orange-red oil was obtained in 80% yield relative to the total weight of platinum and of initial reagents. A Cl/Pt ratio of 1.0 was obtained. The concentration of the complex was reduced to 3% by dilution in toluene. This solution was used in the subsequent steps.

EXAMPLE 2

The procedure of Example 1 was repeated, except that the treatment under reflux was for 15 min. A Cl/Pt ratio of 1.4 was obtained.

EXAMPLE 3

The procedure of Example 1 was repeated, except that the treatment under reflux was for 8 min. A Cl/Pt ratio of 1.9 was obtained.

EXAMPLE 4

The procedure of Example 1 was repeated, except that the treatment under reflux was for 30 min. A Cl/Pt ratio of 0.9 was obtained.

EXAMPLE 5

The procedure of Example 1 was repeated exactly, except that the β-myrcene was replaced by β-springene. A Cl/Pt ratio of 1.0 was obtained.

COMPARATIVE EXAMPLE 6C

Synthesis of a platinum/styrene complex

The procedure of Example (1) of European Patent No. 57,459 was repeated exactly, except that the refluxing temperature and reaction time was respectively 75°–77° C. and 30 min. The complex was obtained with difficulty in the form of a black tar having a Cl/Pt ratio of 2.5, and this was subsequently used in 3% solution in toluene.

EXAMPLE 7

Reactivity of the platinum/β-myrcene and /β-springene complexes in solvent-free compositions for rendering paper non-sticking A treatment bath was prepared according to the following procedure:

100 parts of a silicone composition were formulated, containing:
(a) 90.5% of a polydimethylsiloxane copolymer having vinyl units in the chain and with a dimethylvinylsilyloxy end group, having approximately 3% by weight of vinyl groups and having a viscosity of approximately 250 mPa.s at 25° C.;

(b) 2.5% of 1,3,5,7-tetramethyl-1,3,5,7-tetravinylcyclotetrasiloxane; and (c) 7% of a polymethylhydrosiloxane fluid having a trimethylsilyloxy end group, used as a crosslinking agent and comprising approximately 1.5% by weight of hydrogen atoms bonded to silicon, and having a viscosity of approximately 20 mPa.s at 25° C.

To this bath there were added:

(d) 60 ppm of platinum ($3 \times 10^{-4}$ g-at. of Pt/kg of composition) in the form of a platinum complex prepared in Examples 1, 2, 3 and 5.

The mixture was stirred vigorously at room temperature for a few minutes, and this mixture was then, without using a solvent, deposited onto paper (approximately 1 g of mixture per m²) by means of a coating rod, and the silicone composition was hardened in a forced-air circulation oven set to a variable temperature.

The hardening time of the silicone coating was thus studied by noting the minimum residence time in the oven needed to obtain a fully-hardened coating. The results obtained are reported in Table I below:

TABLE I

| Nature of the catalyst | Crosslinking time (in seconds) (Oven temperature) (110° C.) | Cl/Pt |
|---|---|---|
| Example 1 | 15 | 1.0 |
| Example 2 | 17 | 1.4 |
| Example 3 | 20 | 1.9 |
| Example 5 | 25 | 1.0 |
| (*) | 30 | 4.6 |
| $H_2PtCl_6.6H_2O$ | >120 | 5.9 |
| Example 6C | >60 | 2.5 |

NB:
(*) catalyst which is the product of reaction of chloroplatinic acid with octanol, according to U.S. Pat. No. 3,220,972.

EXAMPLE 8

To 100 g of polydimethylsiloxane oil having dimethylvinylsilyloxy end groups (0.4% by weight of vinyl groups relative to the weight of the polymer) having a viscosity 600 mPa.s at 25° C., there were added 45.0 g of pyrogenic silica having a specific surface of 300 m²/g and treated with hexamethyldisilazane. To this mash was added an organosilicone composition containing:

(a) 1.7 g of a polydimethylsiloxane copolymer having hydromethylsilyloxy units in the chain, possessing, relative to the weight of the polymer, 0.24% of hydrogen atoms bonded to silicon and having approximately 120 atoms of silicon per molecule;

(b) 8 g of a polydimethylsiloxane polymer having dimethylhydrosilyloxy end groups and a viscosity of 30 mPa.s at 25° C.; and (c) x ppm of platinum metal in the form of a platinum/β-myrcene complex catalyst in 3% strength solution, prepared as in Example 1. After being mixed, the composition crosslinked at room temperature, and the increase in viscosity of the composition with time and the top/bottom Shore A hardness of the test pieces formed after 24 hours of crosslinking were measured. The results are reported in Table II below:

TABLE II

| Nature of the catalyst and content of Pt metal in ppm | Stability of the bath | Shore A hardness (top/bottom) (**) |
|---|---|---|
| (*) 8 ppm | 3 h | 20/23 |
| Example 1 8 ppm | 3 h | 19/23 |
| Example 1 12 ppm | 2 h | 20/22 |

NB:
(*) Catalyst which is the product of reaction of chloroplatinic acid with octanol, according to U.S. Pat. No. 3,220,972.
(**) Top = hardness measured on the face surface of the test piece exposed to the air
Bottom = hardness measured on the face surface of the test piece in contact with the base of the mold.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising an organopolysiloxane curable by hydrosilylation comprising (1) at least one organopolysiloxane having, per molecule, at least two alkylenically unsaturated groups bonded to a silicon atom and (2) at least one organohydropolysiloxane having, per molecule, at least three ≡SiH groups, and a catalytically effective amount of a hydrosilylation catalyst which comprises a platinum/olefin complex comprising halogen values, the olefin moiety thereof which comprises an aliphatic triene having the general formula:

$$\begin{array}{c} R_1 \\ \phantom{R}\diagdown \\ \phantom{RRR}CH=CH-(CH_2)_{\overline{2}}C-CH=CH_2 \\ \phantom{R}\diagup \phantom{RRRRRRRRRRR}\| \\ R_2 \phantom{RRRRRRRRRRRR}CH_2 \end{array}$$

wherein $R_1$ is a linear or branched chain alkyl radical having from 1 to 6 carbon atoms, and $R_2$ is $R_1$ or a linear or branched chain alkenyl radical having from 2 to 16 carbon atoms and at least one site of ethylenic unsaturation, and said complex having a ratio, in gram-atoms of halogen to gram-atoms of platinum, ranging from virtually 0 to 4.

2. The organopolysiloxane composition as defined by claim 1, comprising:

(1) at least one organopolysiloxane containing silyloxy units of the formula:

$$Y_a Z_b SiO_{\frac{4-a-b}{2}} \quad (1)$$

in which Y is an alkylenically unsaturated hydrocarbon group having from 2 to 4 carbon atoms, Z is an inert monovalent hydrocarbon, a ranges from 1 to 3; b ranges from 0 to 2 and the sum a+b ranges from 1 to 3, with any remaining units comprising units of the formula:

$$Z_c SiO_{\frac{4-c}{2}} \quad (2)$$

in which Z is as defined above and c ranges from 0 to 3; and (2) at least one organohydropolysiloxane containing silyloxy units of the formula:

$$H_d W_e SiO_{\frac{4-d-e}{2}} \quad (3)$$

in which W is Z, d ranges from 1 to 3, e ranges from 0 to 2, and d+e ranges from 1 to 3, with any remaining units comprising units of the formula:

$$W_g SiO_{\frac{4-g}{2}} \quad (4)$$

in which W is as defined above and g ranges from 0 to 3.

3. The organopolysiloxane composition as defined by claim 2, diluted in an organic solvent compatible therewith.

4. The organopolysiloxane composition as defined by claim 2, solvent-free, and having a viscosity no greater than 5000 mPa.s at 25° C.

5. A substrate coated with the organopolysiloxane composition as defined by claim 2.

6. The organopolysiloxane composition as defined by claim 2, further comprising a filler material.

* * * * *